United States Patent

[11] 3,627,966

[72] Inventors Cornelis van Osenbruggen;
Gerrit Luimes; Ate van Dijk, all of Emmasingel, Eindhoven, Netherlands
[21] Appl. No. 20,874
[22] Filed Mar. 27, 1970
[45] Patented Dec. 14, 1971
[73] Assignee North American Philips Company Inc. New York, N.Y.
[32] Priority Oct. 16, 1965
[33] Netherlands
[31] 6513424
Continuation of application Ser. No. 587,326, Oct. 17, 1966. This application Mar. 27, 1970, Ser. No. 20,874

[54] DEVICE FOR REMOVING MATERIAL FROM A WORKPIECE BY MEANS OF SPARK EROSION
15 Claims, 4 Drawing Figs.

[52] U.S. Cl. .................................................. 219/69 C
[51] Int. Cl. .................................................. B23k 9/16
[50] Field of Search .......................................... 219/69 E, 69 C, 69 P

[56] References Cited
UNITED STATES PATENTS
2,773,168  12/1956  Williams ...................... 219/69 C X
3,033,971  5/1962   Pfau .............................. 219/69 C
3,259,795  7/1966   Schierholt ..................... 219/69 C X Primary Examiner—J. V. Truhe
Assistant Examiner—Hugh D. Jaeger
Attorney—Frank R. Trifari ABSTRACT: A spark erosion device including a storage capacitor which is periodically discharged across the gap between the electrode and workpiece. The improvement concerns means for limiting the duration of the arc discharge phase of the operation comprising, a source of constant current for charging the capacitor, means for disconnecting the current source from the capacitor when the gap breakdown voltage is reached, and the addition of an inductor in the capacitor discharge circuit to provide a resonant effect to limit the arc time across the gap.

DEVICE FOR REMOVING MATERIAL FROM A WORKPIECE BY MEANS OF SPARK EROSION

This is a continuation of application Ser. No. 587,326 filed Oct. 17, 1966.

This invention relates to devices for removing material from a workpiece by means of spark erosion.

Such a device is known. In the known device a capacitor is arranged in parallel with the working area, i.e. the space between the workpiece and the working electrode, said capacitor being charged through a resistor from the voltage source. When the capacitor has charged to a given voltage it is discharged through the dielectric medium between the workpiece and the electrode. The spark energy is capable of removing material from the workpiece.

The known device has several disadvantages.

In the first place the charging period of the capacitor is limited by the value of the charging resistor. This value must be higher than a critical resistance to prevent an arc discharge in the working space. Furthermore, in the case of a short circuit between the workpiece and the electrode, a maximum current occurs which is likewise determined by the charging resistor. This current must not be excessive for electrodes having small working surfaces in order to avoid deterioration of the electrodes. The charging resistance which, necessarily, is high, results in an unnecessarily low recurrence frequency of the spark discharges and hence in a low rate of chipping.

In the second place a long charging period is often undesirable since the presence of impurities, for example, metal particles which have been released through the spark erosion which is in progress, may give rise to premature formation of a spark. The said particles are believed to form bridges which affect the normal course of the equipotential lines between the electrode and the workpiece, and thereby cause an accelerated premature breakdown. The buildup of the electrical field between the particles and the electrode takes a finite time, for example, several hundredths of a microsecond. A short charging period of the capacitor can ensure that this buildup period is not reached.

In the third place, the substantially total discharge of the capacitor proceeds comparatively slowly. During the first part of the discharge period, the discharge has the character of a spark. The spark is characterized by a comparatively high voltage and a comparatively small, but very rapidly increasing current, and hence a high $di/dt$. During the second part of the discharge period, the discharge has the character of an arc. The arc is characterized by a comparatively low voltage and a current which is large, but increases only slightly in time, and hence a low $di/dt$.

The spark and arc phases of the capacitor discharge naturally merge into each other progressively.

Investigation of the phenomena has shown that the arc phase of the capacitor discharge is of little use, and is even harmful for precision treatments in the case of chipping by means of spark erosion. The surface condition of both the workpiece and the electrode is affected adversely due to thermal effects of the arc discharge. It appears from experiments that the wear ratio, that is the ratio between the amount of material removed from the workpiece and the amount removed from the electrode, gets worse as the arc discharge lasts longer.

Accordingly, an object of the invention is to prevent an excessive short circuit current between workpiece and electrode as well as to reduce the charging period and to minimize or eliminate the arc discharge phase of the electric discharge operation.

To this end, the invention is characterized in that the capacitor is charged through a charging circuit having current-limiting properties, means being provided which, at the instant of breakdown, cause the voltage across the discharge space to decrease below the extinction voltage of the spark in a period of time which is shorter than the time period corresponding to the discharge time constant of the circuit constituted by the capacitor and the spark gap.

Underlying the invention is the concept that prolonged charging and discharging periods cause other undesirable phenomena, that is to say, a discharge which is premature and hence relatively ineffective in the case of a long charging period of the capacitor connected across the working space, and an unfavorable wear ratio and harmful attack of the workpiece surface in the case of an unduly long discharging time of said capacitor. Limitation of the total period in which a voltage exists between electrode and workpiece is also desirable in cases where the dielectric medium between the electrode and the workpiece exhibits electrochemical effects such as, for example, electrolysis.

In one advantageous embodiment the capacitor is charged from a source of constant current, the supply of current being interrupted when the desired voltage on the capacitor is reached, the charging circuit of the working area including a resonant circuit having an inductor.

In order that the invention may be readily carried into effect, it will now be described in detail, by way of example, with reference to the accompanying diagrammatic drawings, in which.

Figure 1:
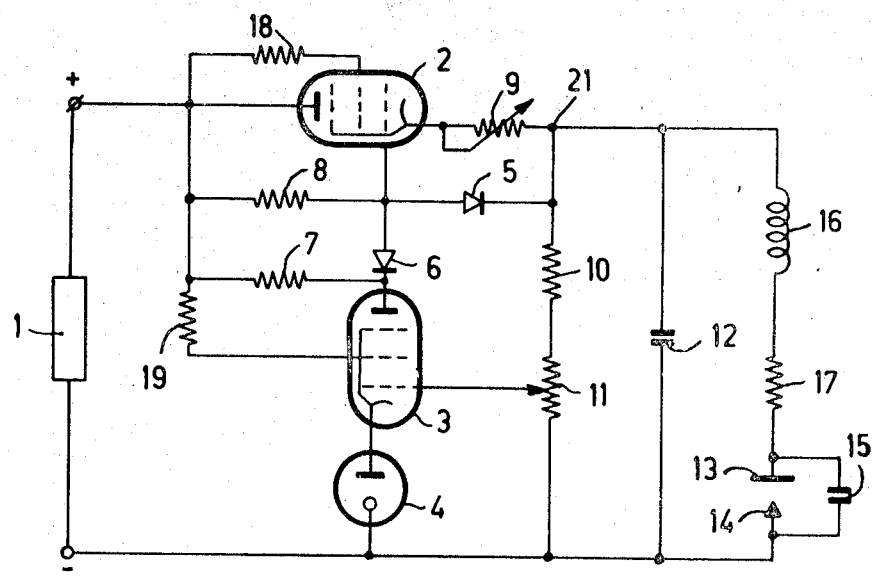
FIG. 1 shows a diagram of a first device according to the invention.

In the circuit of FIG. 1 a capacitor 12 is charged from a direct voltage source 1 through a pentode 2. A cathode resistor 9 serves as a negative feedback resistor. The current flowing through pentode 2, and hence the charging current of capacitor 12, is maintained constant. When capacitor 12, and hence also a capacitor 15 placed between a working electrode 14 and a workpiece 13, has charged to a given value, the charging current suddenly stops. The charging circuit is designed so that the current is interrupted at the breakdown voltage of the working area. The capacitor 15 may consist of the capacitance of the spark gap defined by electrode 14 and workpiece 13.

The abrupt suppression of the current supply to capacitor 12 takes place as follows. At the beginning of the charge period, at the instant $t=t_0$ in the diagram of FIG. 2, the potential of the junction point 21 of capacitor 12 and cathode resistor 9 is much lower than that of the anode of pentode 2. A diode 5 connected between point 21 and the control grid of pentode 2, is conducting and the voltage drop across resistor 8, in series therewith, is high enough to keep a diode 6 cut off. In fact, a pentode 3, which is connected in series with a resistor 7 and a gaseous discharge tube 4 to the voltage source 1, is substantially cut off since the voltage drop across resistors 10 and 11 is negligible, so that the control grid of the tube 3 is negatively adjusted relative to its cathode. The voltage across capacitor 12, and hence the voltage drop across the resistors 10 and 11, increases due to the charging process. The tube 3 begins to conduct. The voltage drop across anode resistor 7, which was negligible at the beginning of the charging time, increases. Finally, the anode potential of pentode 3 becomes lower than the potential of the control grid of pentode 2. The diode 6, which is connected between the control grid of pentode 2 and the anode of pentode 3, now conducts and the control grid assumes the low potential of the anode of pentode 3, thereby causing diode 5 and the pentode 2 to cut off. The charging of capacitor 12 stops abruptly.

Figure 2:
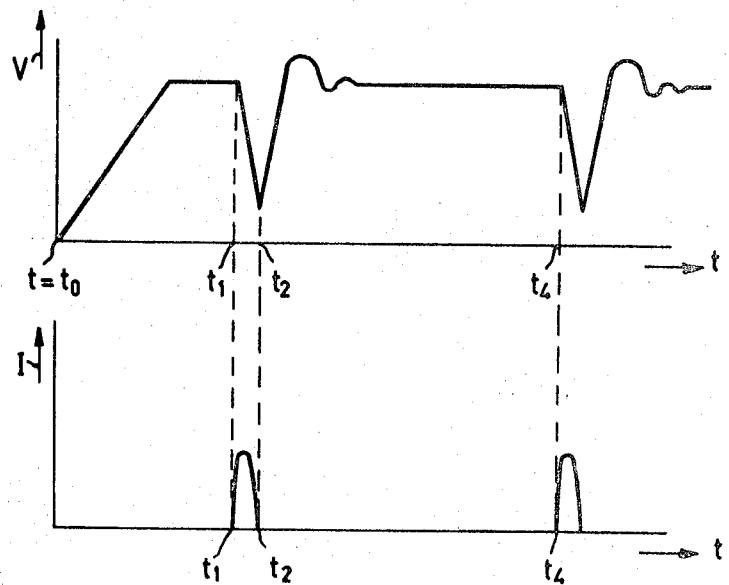
FIG. 2 shows diagrams to clarify the operation of the device of FIG. 1.

A spark discharge occurs in the medium between the working electrode 14 and the workpiece 13 between the instants $t_1$ and $t_2$ (FIG. 2). During the spark discharge the voltage across the gap decreases very rapidly to the arc voltage ($t_2-t_1$ is of the order of at most a few tenths of a microsecond). Due to the discharge of capacitor 15, a high current momentarily occurs in the discharge circuit. For maintaining an arc discharge, it is necessary to supply a current from without, that is to say from capacitor 12. However, an abrupt supply of current is prevented by an inductor 16. The arc produced is extinguished since the voltage across the working area has decreased below the ignition voltage. Capacitor 15 is now charged again. The coaction of inductor 16 and capacitor 15 causes a sinusoidal voltage waveform across the working area having a frequency which is substantially determined by the values of inductor 16 and capacitor 15. A resistor 17 in series with inductor 16 and capacitor 15 ensures that the alternating voltage is rapidly damped.

The voltage across capacitor 12, which has decreased slightly due to the charge supplied to the capacitor 15, is recharged to its initial value from the voltage source 1.

A subsequent breakdown between the electrode 14 and the workpiece 13 occurs at the instant $t=t_4$. In fact, the spark gap medium needs some time to recover from the previous breakdown between the instants $t_1$ and $t_2$.

In one embodiment the pentodes 2 and 3 were of the type E 130 L, the diodes 5 and 6 were of the type OA 90 and BY 100, respectively. The resistors 7, 8, 18 and 19 were 10 k$\Omega$,0 100 k$\Omega$220$\Omega$ and 22k$\Omega$ respectively. The resistors 9, 10, and 11 were at most 1k$\Omega$, 22k$\Omega$ and 50k$\Omega$, respectively. Capacitor 12 was 180 pf., inductor 16 was 25 $\mu$H, resistor 17 was 47$\Omega$ and capacitor 15 had a value of 60 pf. The time $t_2-t_1$ was of the order of 30 nanoseconds. The time $t_4-t_2$ was 1.2 microseconds.

In FIG. 2, the voltage across, and the current through, the working area are plotted as a function of time.

The charge current of capacitor 12 is controlled by varying the resistor 9. The voltage across capacitor 12, which is matched to the breakdown voltage of the space between the workpiece 13 and the working electrode 14, is adjusted by connecting the control grid of pentode 3 to a variable tapping on resistor 11.

It will be evident that the current from the voltage source 1 is determined by the cathode resistor 9 of pentode 2 and is not influenced by any short circuit of the working area.

Figure 3:
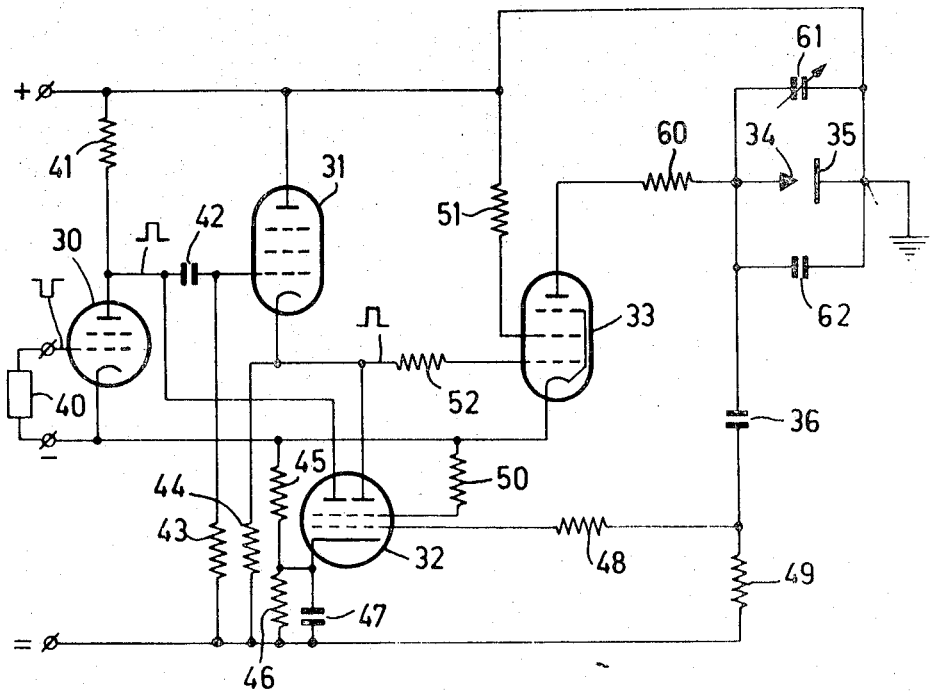
FIG. 3 shows a diagram of a second device according to the invention.
Figure 4:
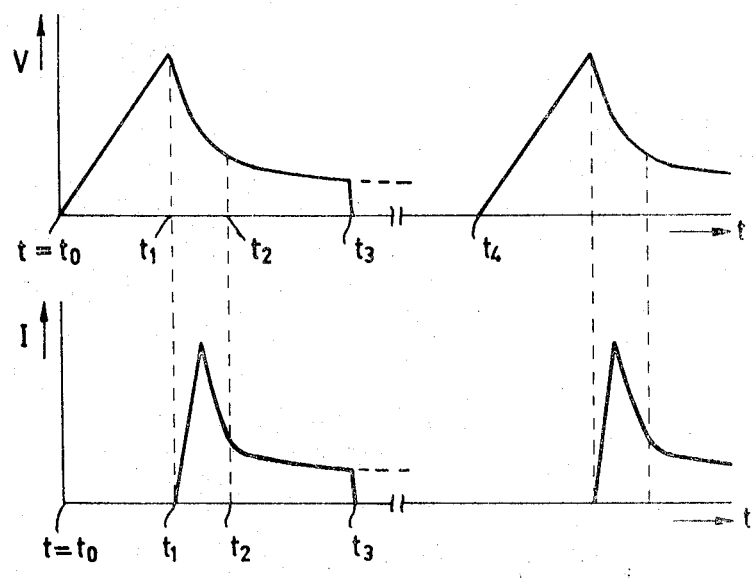
FIG. 4 shows diagrams to clarify the operation of the device of FIG. 3.

A circuit is shown in FIG. 3 which has a very short charge period of the capacitor connected across the working area. This circuit is therefore especially suitable in the event that unwanted electrochemical effects may occur in the medium.

Short pulses originating from a pulse source 40 are fed to the control grid of an amplifying tube 30. The pulses appearing at the anode of tube 30 are transmitted in turn to the control grid of a pentode 31, which is connected as a cathode follower. The cathode follower 31 controls an output tube 33. The output circuit of output tube 33 includes a parasitic capacitance 62 formed by the working electrode 34 and the workpiece 35. A discharge capacitor 61 is connected in parallel with said capacitance. It is also possible to use only the anode capacitance of output tube 33 as the discharge capacitor. The discharge capacitor 61 is charged in a very short time (from 0.1 to 1 $\Omega$sec.), whereafter a spark discharge takes place in the medium between a working electrode 34 and a workpiece 25. The voltage across the working area rapidly decreases to the arc voltage. The arc is suppressed very rapidly so that the total duration of the charging and discharging processes is shorter than the duration of the pulses derived from pulse source 40.

The suppression of the arc takes place as follows: The voltage drop from spark voltage to arc voltage is transmitted through a capacitor 36 to the commonly connected control grids of a double tetrode 32, which become positive relative to the cathode potential due to the voltage drop and the tetrode becomes conducting. One half of dual tetrode 32 is connected in parallel with a cathode resistor 44 of the cathode follower 31, and the other half is of the dual tetrode included in the control circuit of the cathode follower 31.

The effect of the tetrode 32 becoming conducting is that the control grids of the tubes 31 and 33 assume a more negative potential. The output tube 33 and the tube 31 cut off, although the output pulse from the source 40 is still present. The voltage difference between the working electrode 34 and the workpiece 35 disappears almost completely.

In one embodiment tube 30 was of the type QQE 02/5, tube 31 was of the type EL 86, tube 32 was of the type QQE 02/5 and tube 33 was of the type EL 500. The resistors 41, 43, 44, 45, 46, 48, 49 and 50 were 33 k$\Omega$, 100 k$\Omega$, 2.2 k$\Omega$, 4.7 k$\Omega$, 390 $\Omega$, 47 k$\Omega$, 100 k$\Omega$ and 3,3 k$\Omega$, respectively. The resistors 51, 52 and 60 were 680 $\Omega$, 27 $\Omega$ and 12$\Omega$ respectively. Capacitor 42 was 10,000 pf. capacitor 47 was 0.27 pf. and capacitor 36 was 30pf. Capacitor varied between 100 pf. 20,000 pf. and capacitor 62 was 50 pf.

Pulses of 2 $\mu$sec. duration having a recurrence frequency of 100 kc./sec. were derived from the voltage source 40. The total charge period of capacitor 62 was 0.5 $\mu$sec. The spark period $t_2-t_1$ was 100 nanoseconds. The greatly reduced arc period $t_3-t_2$ was 200 nanoseconds and the duration $t_4-t_0$ was 10 $\mu$sec. The maximum current during the discharge period was 30 amps.

In order to suppress a reverse pulse, it is possible to arrange a diode in parallel with capacitor 62. A series resistor of several ohms placed between capacitor 61 and capacitor 62 may serve the same purpose.

What is claimed is:

1. A device for electrically eroding material from a workpiece by means of electric spark discharges produced across a spark gap work area defined by the workpiece and an adjacent electrode comprising, a source of electric energy, a capacitor, a discharge circuit connecting said capacitor to said electrode and workpiece, a charging circuit having current-limiting properties that are independent of the spark gap and connecting said capacitor to said energy source, and means for causing, at the instant of gap breakdown, the voltage across the work discharge area to decrease to a level below the spark extinction voltage of the spark gap work area in a period of time which is shorter than the time period corresponding to the time constant of the discharge circuit constituted by the capacitor and the spark gap.

2. A device as claimed in claim 1 wherein said energy source comprises a source of constant current, means responsive to the capacitor voltage for interrupting the supply of current to the capacitor at a given voltage across the capacitor, and a charging circuit for the gap work area including an inductor that forms a resonant circuit therewith.

3. A device as claimed in claim 1 further comprising, a first active control element connected between the energy source and the capacitor, a second active control element connected in parallel with the energy source, a first rectifier arranged between a control electrode of the first active element and the capacitor, a second rectifier connected in series with the second active element and connected to the control electrode of the first active element, and means for deriving a control voltage for the second active element from the voltage across the capacitor.

4. A device as claimed in claim 1 further comprising, control means connected between the energy source and the capacitor, an amplifying element which forms part of the transmission path between the energy source and the capacitor, means for coupling the output of said amplifying element to said control means to control the condition thereof, and means for coupling the voltage across the capacitor to the control electrode of the amplifying element so as to produce a cutoff condition in said means thereby to cut off the voltage from the source when the voltage across the capacitor decreases.

5. A device as claimed in claim 4 wherein said control means includes a cathode follower device connected in the transmission path and having a cathode resistor, and means connecting the amplifying element in parallel with the cathode resistor of said cathode follower device.

6. A device as claimed in claim 1 further comprising means coupled to said capacitor and responsive to the capacitor voltage for interrupting the supply of charging current to the capacitor when the capacitor is charged up to the breakdown voltage of the gap work area.

7. A device as claimed in claim 1 wherein said energy source and said charge circuit together from a source of constant current for said capacitor and the spark gap work area which limits the current to a constant value during the whole spark erosion process.

8. A device as claimed in claim 1 further comprising, an inductor connected in series with the gap work area, and means connecting the series combination of the inductor and the gap work area in parallel with said capacitor across the energy source.

9. Spark erosion apparatus for removing material from a workpiece comprising, an electrode confronting said workpiece to define a spark discharge gap, a source of electric energy, a capacitor, a charge circuit having current-limiting properties that are independent of the spark gap, means including said charge circuit for coupling said capacitor and said spark gap to said energy source, a discharge circuit connecting said capacitor to said electrode and workpiece, and means controlled by the capacitor voltage for periodically interrupting the flow of charge current to said capacitor whenever the gap voltage reaches the gap breakdown voltage.

10. Apparatus as claimed in claim 9 further comprising a second capacitor directly connected across said electrode and workpiece, said second capacitor and said spark gap being chosen to have a discharge time constant that is shorter than the discharge time constant of the first capacitor and said spark gap.

11. Apparatus as claimed in claim 10 further comprising an inductor connected in the charge circuit of said second capacitor and in the discharge circuit of the first capacitor.

12. Apparatus as claimed in claim 11 wherein said energy source comprises a source of constant current, and said interrupting means comprises a control element serially connected in the charge circuits of said first and second capacitors.

13. Apparatus as claimed in claim 9 further comprising a nonsaturating inductor connected in the discharge circuit of said capacitor for limiting the flow of discharge current from the capacitor to the spark gap during the breakdown periods of the gap.

14. Apparatus as claimed in claim 9 wherein said interrupting means comprises a control element serially connected in the charge circuits of said capacitor and the spark discharge gap.

15. Apparatus as claimed in claim 9 wherein said energy source and said charge circuit together form a source of constant current for said capacitor and the spark discharge gap.

* * * * *